United States Patent
Suit

(10) Patent No.: US 9,426,024 B2
(45) Date of Patent: Aug. 23, 2016

(54) ESTABLISHING COMMUNICATION BETWEEN ENTERPRISE NODES MIGRATED TO A PUBLIC CLOUD AND PRIVATE ENTERPRISE INFRASTRUCTURE

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 393 days.

(21) Appl. No.: 12/905,850

(22) Filed: Oct. 15, 2010

(65) Prior Publication Data

US 2012/0096171 A1    Apr. 19, 2012

(51) Int. Cl.
G06F 15/16 (2006.01)
H04L 12/24 (2006.01)

(52) U.S. Cl.
CPC ..................... *H04L 41/08* (2013.01)

(58) Field of Classification Search
CPC ..................................... G06Q 30/04
USPC ........ 709/205, 221, 229, 225, 203; 370/389; 379/93.09
See application file for complete search history.

(56) References Cited

U.S. PATENT DOCUMENTS

| | | | |
|---|---|---|---|
| 6,513,059 B1 | 1/2003 | Gupta et al. | |
| 6,658,465 B1 | 12/2003 | Touboul | |
| 6,871,223 B2 | 3/2005 | Drees | |
| 7,082,463 B1 | 7/2006 | Bradley et al. | |
| 7,571,349 B2 | 8/2009 | Levidow et al. | |
| 7,624,172 B1 | 11/2009 | Austin-lane | |
| 7,769,720 B2 | 8/2010 | Armington | |
| 7,793,162 B2 | 9/2010 | Mock et al. | |
| 7,826,602 B1* | 11/2010 | Hunyady et al. | 379/93.09 |
| 7,890,318 B2 | 2/2011 | Castellani et al. | |
| 7,975,058 B2* | 7/2011 | Okmianski et al. | 709/229 |
| 8,156,378 B1 | 4/2012 | Suit | |
| 8,185,442 B2 | 5/2012 | Kiran Vedula | |
| 8,234,377 B2* | 7/2012 | Cohn | 709/225 |
| 8,295,277 B2* | 10/2012 | Vadlakonda et al. | 370/389 |
| 8,396,946 B1* | 3/2013 | Brandwine et al. | 709/220 |
| 8,656,009 B2 | 2/2014 | Suit | |
| 8,656,219 B2 | 2/2014 | Suit | |
| 8,850,423 B2 | 9/2014 | Barkie et al. | |
| 2003/0177112 A1 | 9/2003 | Gardner | |
| 2003/0225876 A1 | 12/2003 | Oliver et al. | |
| 2004/0133672 A1 | 7/2004 | Bhattacharya | |
| 2005/0044206 A1 | 2/2005 | Johansson et al. | |
| 2005/0240606 A1 | 10/2005 | Edelstein | |
| 2005/0268298 A1 | 12/2005 | Hunt et al. | |
| 2006/0069768 A1 | 3/2006 | Wen et al. | |
| 2006/0074833 A1 | 4/2006 | Gardner et al. | |
| 2006/0195715 A1 | 8/2006 | Herington | |
| 2006/0230134 A1 | 10/2006 | Qian et al. | |
| 2007/0083506 A1 | 4/2007 | Liddell | |

(Continued)

OTHER PUBLICATIONS

Red Hat Office Action for U.S. Appl. No. 12/905,565, mailed Apr. 11, 2013.

(Continued)

*Primary Examiner* — Kevin C Harper
*Assistant Examiner* — Derrick V Rose
(74) *Attorney, Agent, or Firm* — Lowenstein Sandler LLP

(57) ABSTRACT

An agent is deployed to a node of an enterprise network, where the agent is configured to establish communication with the enterprise network after migration of the node to a cloud infrastructure. Further, the node is migrated to the cloud infrastructure, and communication is established between the node and the enterprise network using the agent.

18 Claims, 11 Drawing Sheets

(56) References Cited

U.S. PATENT DOCUMENTS

| | | | |
|---|---|---|---|
| 2007/0118394 A1 | 5/2007 | Cahoon | |
| 2007/0180081 A1* | 8/2007 | Okmianski et al. | 709/223 |
| 2007/0220121 A1 | 9/2007 | Suwarna | |
| 2008/0256010 A1 | 10/2008 | Moran et al. | |
| 2009/0028053 A1 | 1/2009 | Kannan et al. | |
| 2009/0089781 A1 | 4/2009 | Shingai et al. | |
| 2009/0182880 A1 | 7/2009 | Inamdar | |
| 2009/0204701 A1 | 8/2009 | Herzog et al. | |
| 2009/0228579 A1 | 9/2009 | Sanghvi et al. | |
| 2009/0228589 A1 | 9/2009 | Korupolu | |
| 2009/0307772 A1 | 12/2009 | Markham et al. | |
| 2010/0049731 A1 | 2/2010 | Kiran Vedula | |
| 2010/0138390 A1 | 6/2010 | Lobo | |
| 2010/0161604 A1 | 6/2010 | Mintz et al. | |
| 2010/0287263 A1* | 11/2010 | Liu et al. | 709/221 |
| 2010/0318609 A1* | 12/2010 | Lahiri et al. | 709/205 |
| 2012/0096065 A1 | 4/2012 | Suit | |
| 2012/0096134 A1 | 4/2012 | Suit | |
| 2012/0096142 A1 | 4/2012 | Suit | |
| 2012/0096143 A1 | 4/2012 | Suit | |
| 2012/0185913 A1* | 7/2012 | Martinez et al. | 726/1 |
| 2012/0221898 A1 | 8/2012 | Suit | |
| 2013/0060839 A1* | 3/2013 | Van Biljon et al. | 709/203 |

OTHER PUBLICATIONS

Red Hat Office Action for U.S. Appl. No. 12/905,565, mailed Sep. 27, 2013.
Red Hat Notice of Allowance for U.S. Appl. No. 12/905,565, mailed Apr. 18, 2014.
Red Hat Office Action for U.S. Appl. No. 12/905,688, mailed Sep. 11, 2013.
Red Hat Office Action for U.S. Appl. No. 12/905,688, mailed Mar. 18, 2014.
Red Hat Office Action for U.S. Appl. No. 12/905,565, mailed Oct. 12, 2012.
Red Hat Office Action for U.S. Appl. No. 12/905,645, mailed Sep. 13, 2012.
Red Hat Office Action for U.S. Appl. No. 12/905,645, mailed Mar. 26, 2013.
Red Hat Office Action for U.S. Appl. No. 12/905,688, mailed Oct. 4, 2012.
Red Hat Office Action for U.S. Appl. No. 12/905,688, mailed Feb. 27, 2012.
Red Hat Office Action for U.S. Appl. No. 12/905,761, mailed Oct. 22, 2012.
Red Hat Office Action for U.S. Appl. No. 12/905,879, mailed Jul. 8, 2011.
Red Hat Notice of Allowance for U.S. Appl. No. 12/905,879, mailed Dec. 8, 2011.
Red Hat Office Action for U.S. Appl. No. 13/439,803, mailed Aug. 31, 2012.
Red Hat Notice of Allowance for U.S. Appl. No. 13/439,803, mailed Feb. 21, 2012.
Red Hat Office Action for U.S. Appl. No. 12/905,645, mailed May 6, 2015.
Red Hat Office Action for U.S. Appl. No. 12/905,645, mailed Nov. 18, 2015.
Red Hat Notice of Allowance for U.S. Appl. No. 12/905,688, mailed Sep. 10, 2014.
Red Hat Office Action for U.S. Appl. No. 12/905,761, mailed Apr. 11, 2013.
Red Hat Notice of Allowance for U.S. Appl. No. 12/905,761, mailed Oct. 4, 2013.

* cited by examiner

ESTABLISHING COMMUNICATION BETWEEN ENTERPRISE NODES MIGRATED TO A PUBLIC CLOUD AND PRIVATE ENTERPRISE INFRASTRUCTURE

CROSS-REFERENCE TO RELATED APPLICATIONS

This application relates to co-pending applications: U.S. patent application Ser. No. 11/767,173, filed on Jun. 22, 2007, titled "Method and system for cloaked observation and remediation of software attacks"; U.S. patent application Ser. No. 11/867,456, filed on Oct. 4, 2007, titled "Method and system for collaboration involving enterprise nodes"; and U.S. patent application Ser. No. 12/626,872, filed on Nov. 27, 2009, titled "Network traffic analysis using a dynamically updating ontological network description This application further relates to the Applicant's co-pending applications:

Ser. No. 12/905,565, filed on Oct. 15, 2010, now U.S. Pat. No. 8,825,838, issued Sep. 2, 2014, titled "System and method for identification of business process application service groups";

Ser. No. 12/905,645, filed on Oct. 15, 2010. titled "System and method for migration of network entities to a cloud infrastructure";

Ser. No. 12/905,688, filed Oct. 15, 2010, now U.S. Pat. No. 8,938,489, issued Jan. 20, 2015, titled "System and method for monitoring system performance changes based on configuration modification";

Ser. No. 12/905,761, filed Oct. 15, 2010, now U.S. Pat. No. 8,656,009, issued Feb. 18, 2014, titled "System and method for indicating the impact to a business application service group resulting from a change in state of a single business application service group node";

Ser. No. 12/905,879, filed Oct. 15, 2010, now U.S. Pat. No. 8,156,378, issued Apr. 10, 2012 titled "System and method for determination of the root cause of an overall failure of a business application service".

The entire contents of each of the above mentioned applications are specifically incorporated herein by reference.

FIELD OF THE INVENTION

Embodiments of the invention relate generally to network traffic analysis and, in particular, to systems and methods for migrating network nodes to, or within, a cloud computing infrastructure.

BACKGROUND

Traditionally Enterprise managers have had to choose which nodes of an Enterprise network they would consider to migrate to a cloud infrastructure. The nodes are most often members of the Virtual infrastructure. Once the Enterprise nodes have been identified, there is no automated method to re-establish connectivity to both the peer Enterprise nodes and key pieces of Infrastructure. Each node must be manually configured with a route and most often a VPN to communicate through to begin re-establishing communication. This manual process can be very time consuming. A need exists to automate this process so that efficiency can be gained and Enterprise managers can take advantage of an elastic cloud environment.

BRIEF DESCRIPTION OF THE DRAWINGS

Reference will now be made, by way of example only, to specific embodiments and to the accompanying drawings in which.

DETAILED DESCRIPTION

Figure 1:
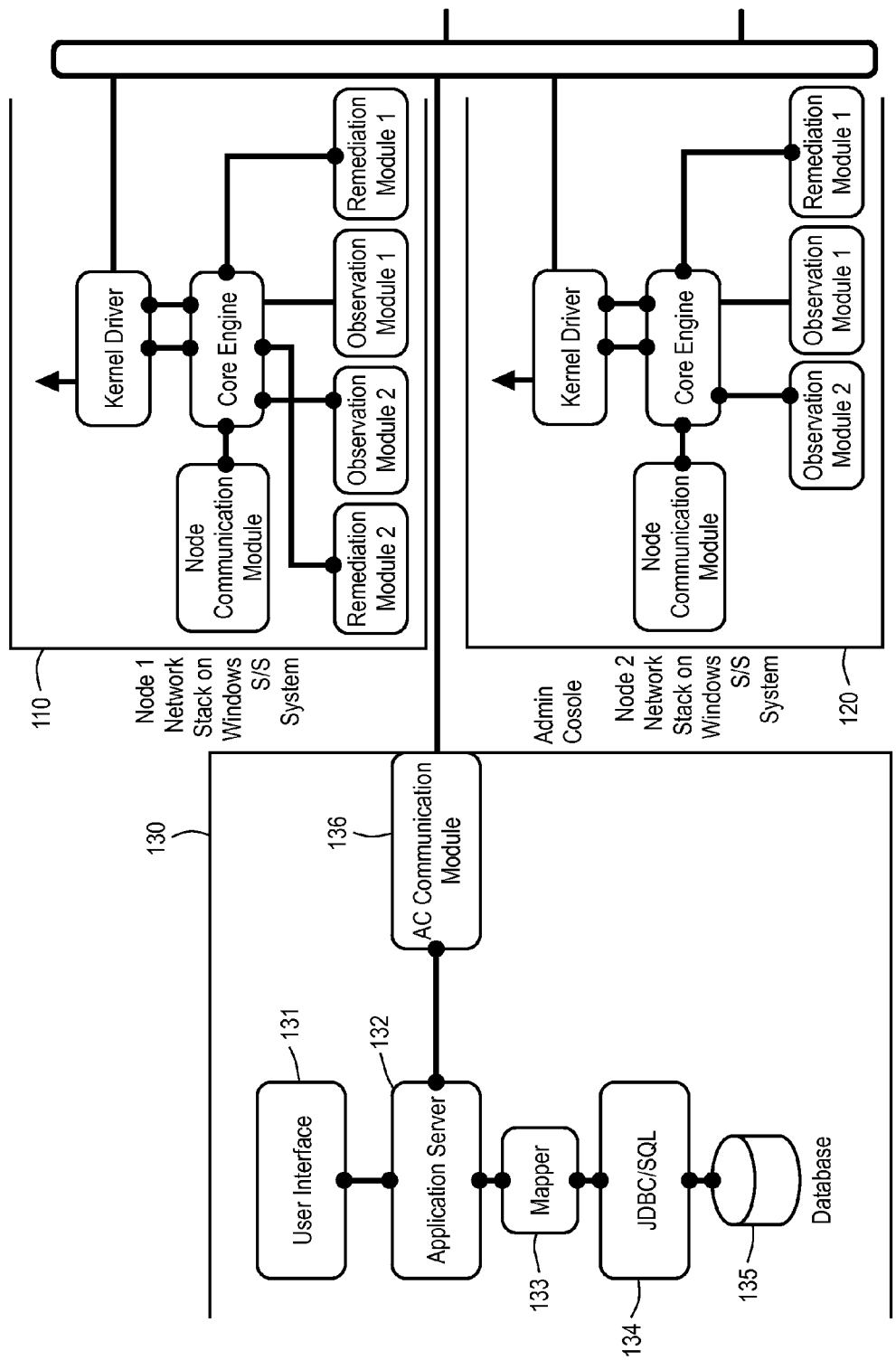
FIG. 1 illustrates an example of a high level component architecture usable in an embodiment of the invention.

Methods and systems for re-establishing communication for a node of an enterprise network migrated to a cloud infrastructure are discussed herein. In one embodiment, a system includes an enterprise network and a proxy server. The enterprise network comprises a plurality of nodes and an administration console. The proxy server may be configured to provide communications between the enterprise network and a cloud infrastructure. The administration console may be configured to communicate with the proxy server, and deploy an agent to at least one node prior to migration of the node to the cloud infrastructure. The agent may be configured to establish communication with the administration console via the proxy server after migration of the node to the cloud infrastructure.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

Modern enterprise networks are designed and architected for client/server computing, as well as peer to peer communication. A host computing machine may attach itself to a modern enterprise network and establish itself on the enterprise utilizing no more than a non-authenticated physical connection.

In one embodiment, software agents could be deployed to nodes within an enterprise network. The agents were used to determine collaborative relationships between the nodes. Various embodiments of the agent and an exemplary process for installing it are described in the following subsections. Further details of the agents are provided in the above referenced patent applications.

The agent could be remotely distributed from a single hardware platform to one or more nodes within an enterprise network. The agent could be installed in stages and each stage can be selected with the characteristics of that node in mind. The configuration at any given node could comprise an observation functionality, an analysis functionality, a reporting functionality, a remediation functionality or some subset of those functionalities.

FIG. 1 illustrates an example of elements that exist within a virtual machine operating in a cloud environment. The cloud environment is comprised of various hardware components such as clients, servers, storage, routers and the like. These elements are usable with an embodiment of the present invention. In this exemplary arrangement there are two network nodes 110 and 120 shown, although the number of network nodes is not intended to be limited to two. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administration console (AC).

In this example, the AC 130 has at least the following components: user interface 131, application server 132, mapper 133, a SQL Server JDBC Driver, Spring with Hibernate, Silverlight, or other similar technologies 134, database 135 and AC communication module 136. The AC 130 propagates an agent, described in more detail below, out to the various network nodes via the data transmission medium. The agent may be propagated and instantiated in stages so as to first cause a receiving network node to install the core aspect or core engine of the agent prior to instantiating other modules of the agent. The installation may be designed to be transparent to the user, with the core engine being hooked into the stack of the operating system of the node. This installation thus yields the disposition of the core engine and stealth kernel driver as shown in each of nodes 110 and 120.

Once the core engine component is installed, the AC 130 may send a communication module component that enables data traffic to be conveyed or communicated to and/or from that network node. These components are shown as the node communication modules in each of nodes 110 and 120. Collectively, the core engine, the node communication module, and the additional modules described below comprise a set of functional modules.

Once the node communication module is installed, the AC can forward one or more additional agent modules to the node. Examples of types of modules will be described below. Each such module can be designed to receive data packets intercepted between an adapter driver and a protocol layer of the node's operating system and then analyze the data packets to determine whether they are indicative of some activity or behavior of interest.

In one possible embodiment, the user interface of the AC will present a security dashboard to an operator. The dashboard will facilitate operator actions intended to remotely install, execute, report on and manage the state of the enterprise from a single geographic location.

In one embodiment, an enterprise IT infrastructure environment, including networks of computer entities consisting of physical and/or virtual machines located at network nodes, may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node, e.g. the administration console 130, via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example a data collection agent may have filter interface at the transport layer and/or a filter interface at the network layer. Thereby, the data collection agent may track information regarding a network connection, the connection duration, and any applications and systems involved in the connection. Moreover, the data collection agent may normalize the foregoing information and report it to the administration console so that different operating systems may be correlated by the administration console.

As a yet further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Figure 2:
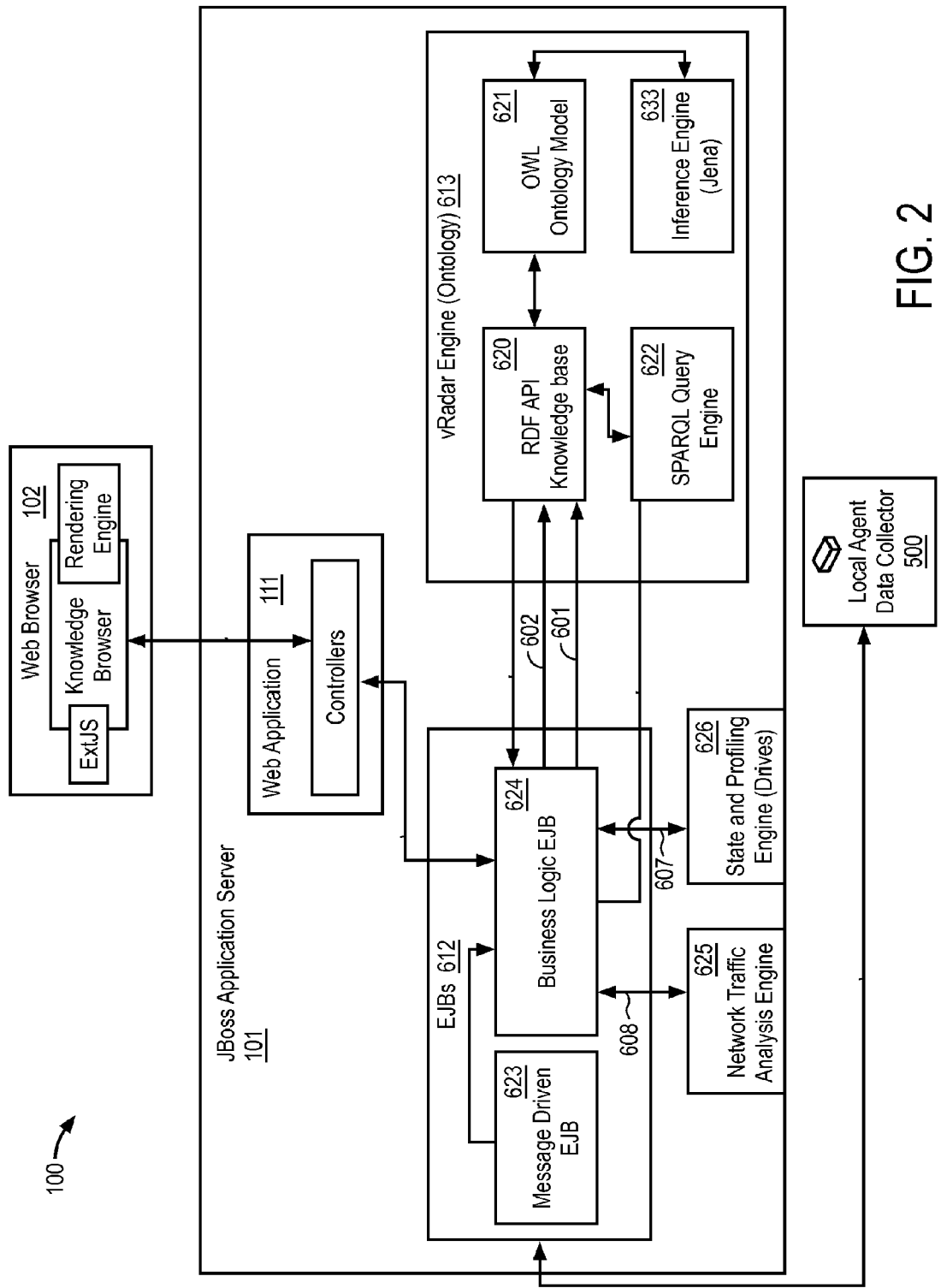
FIG. 2 is an illustrative embodiment of enterprise network including an administration console.

Referring now to FIG. 2, an illustrative system 100 for deploying data collection agents onto network nodes, monitoring network connections instantiated at each network node, acquiring resulting data, automatically creating an ontological description of the network from the acquired data; and dynamically updating the ontological description will be described. The system 100 may further be used for automatically identifying Business Process Application Service Groups within an enterprise network as will be described in more detail below. In an embodiment, elements of system 100 utilize the Java software platform and Enterprise Java Bean (EJB) architecture to provide certain functionality, and these well-known terms may be used in the description that follows. Other software platforms and architectures, providing similar functionality may be used without departing from the scope of the present invention. This may be accomplished with JBoss, J2EE EJB, as well as .Net architectures.

System 100 may comprise an application server 101, which interacts across a network with a number of data collection agents 500 deployed in various nodes of the network. Advantageously, application server 101, may be an element of the administrative console (AC) 130 (FIG. 1) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with relationship exists. A determination may be made by tracking the number of connections of a specific application over a period of time. The period of time may be a system default time or may be preselected, for example, by the system administrator. Importantly, by analyzing such data as source-to-destination data, "communicates_with" relationships can be revealed between two or more nodes even where there is no direct architectural relationship between those nodes.

The system automatically creates a service group for any ontology with a "communicates_with" relationship. The inference is also automatic and performed by the SPARQL engine. This is instantiated by a user request to search for like service groups. Messages handled by the Network Traffic Analysis Engine 625 may include source-to-destination data, qualified by a communicating application within the operating system of the originating node, as well as frequency of communication information. This data is analyzed by processing the number and type of connections to determine if an ontological "communicates_with" relationship exists. A determination may be made by tracking the number of connections of a specific application over a default period of time.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by OWL API 621. For example OWL API 621 may define what entity classes exist, their possible relationship to each other, and their possible state.

Figure 3:
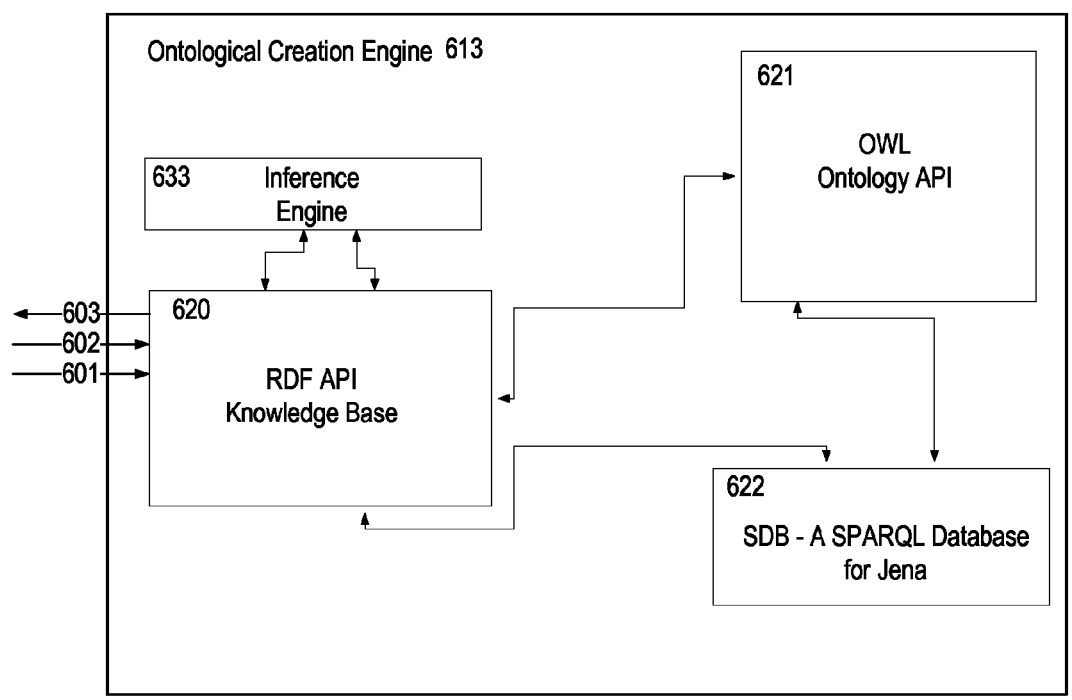
FIG. 3 is an illustrative embodiment of an ontological creation engine.

Referring now to FIG. 3, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena (or SQL and XQuery among others) 622 for later inference processing by inference engine 633. Other examples include inferences which ontological entities will achieve an undesired state by inferring like entities have already achieved an undesired state. The inference engine may also be employed to infer potential ontological relationships among like ontology class structures (i.e., if "VM-A has storage-A", then VM-B which is like VM-A may also be able to have storage-A for storage. Inference engine 633 may determine inferred relationships based on the ontology model contained in OWL Ontology API 621.

Figure 4:
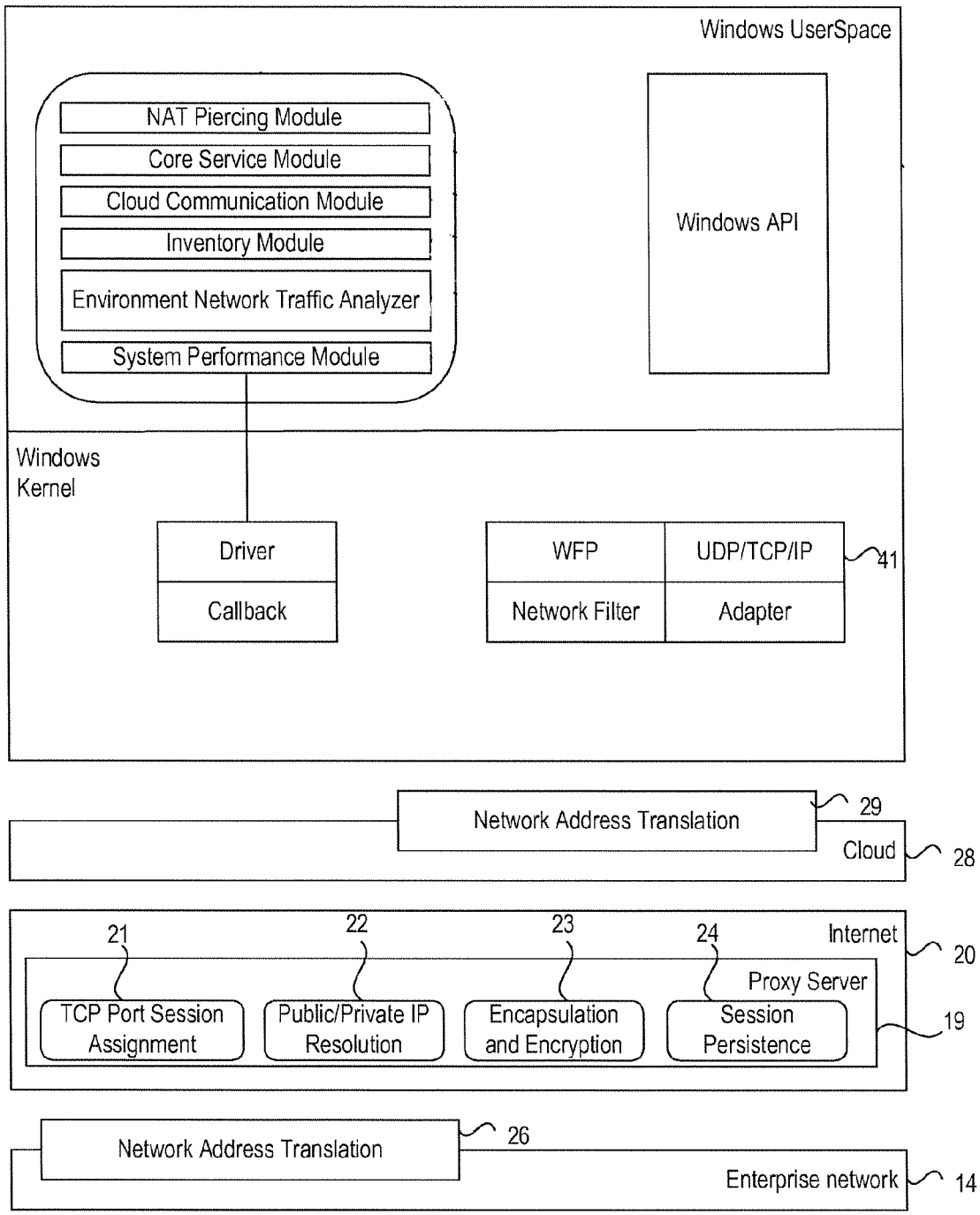
FIG. 4 an enterprise network with a cloud computing environment in accordance with an embodiment.

The enterprise nodes of the system 100 may be comprised of nodes within a local area network, remote nodes and nodes within a cloud infrastructure that communicate with the enterprise network on an internet connection via a proxy server. An embodiment of the network structure is depicted in FIG. 4. The proxy server 19 sits within the internet space 20 and includes modules for TCP Port Session Assignment 21, Public/Private IP Resolution 22, Encapsulation and Encryption 23 and Session Persistence 24. The proxy server 19 resides on the outside of the Enterprise's DMZ or perimeter network, which allows for connections from both the Admin Console and a remote agent in a public Cloud. The proxy server provides a node specific split tunnel to both sides of the proxy server.

The enterprise network 14 may include a Network Address Translation module 26 that provides network address translating functions for all inbound and outbound internet communications with the entities within the enterprise network 14. The enterprise network 14 further comprises an application server including an administration console as described above. The application server communicates with agents on a plurality of physical and virtual machines within the enterprise network as well as communicating with nodes provided within a cloud infrastructure.

The cloud infrastructure 28 may also include a NAT module 29 for controlling internet communications to nodes within the cloud 28.

From time to time, it can be desirable or necessary to migrate virtual machine nodes within the enterprise network to a computing cloud and/or to migrate nodes already within the cloud. To facilitate the migration, Agents are deployed to the nodes and are pre-configured with "call home" data that provides the route to a proxy server that both the Admin Console and the remote guest have access to.

Figure 5:
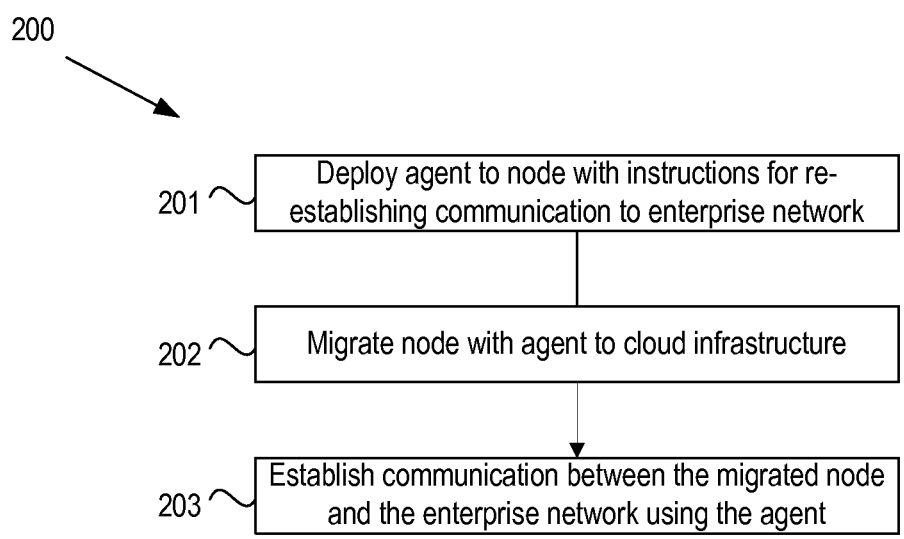
FIG. 5 illustrates a flow diagram of one embodiment of a method for establishing communication between a migrated node and an enterprise network.

FIG. 5 illustrates a flow diagram of one embodiment of a method for establishing communication between a migrated node and an enterprise network. The method of FIG. 5 is performed by processing logic that may comprise hardware (circuitry, dedicated logic, etc.), software (such as is run on a general purpose computer system or a dedicated machine), or a combination of both.

Referring to FIG. 5, method 200, at block 201, an agent is deployed to the node, including updating an existing agent, that is configured to establish communications between the node and the enterprise network. The node with the updated agent is then migrated to a cloud infrastructure (block 202). The agent then executes to re-establish communication between the migrated node and the enterprise network (block 203).

A node 30 that has been migrated to the cloud is shown in FIG. 4. The node 30 may include a software agent as described previously, which includes modules for core service 32, inventory 33, environment network traffic analysis 34 and system performance 35. These modules are provided to enable the node 30 to communicate with the application server to generate the ontological network description described above. The ontology is comprised of relationship descriptions including network relationships. For example, Virtual Machine "A" can access the network using Network Device "A" and the ontology simultaneously describes the actual communication relationship. Another example would be Virtual Machine "A" communicates with Virtual Machine "B" using Primary Application "Oracle." In addition to these modules, additional modules may be deployed to the agent 30 to facilitate migration to or within the computing cloud. The additional modules may include a NAT piercing module 36 and a cloud communications module 37.

Performance of the agent according to some embodiments will now be described with reference to FIGS. 6 to 8. An intermediate driver 410 receives packets from the network and transmits packets to the network. This could be the Guest Core Engine 110 agent. The intermediate driver 410 intercepts packets from this flow and provides them to the Core Engine (CE) 430. In this illustration two aspects of the CE are referred to, XML router 431 and Packet Manager and Ripping Engine 432. The intermediate driver exchanges packets with Packet Manager and Ripping Engine 432. As will be described in connection with FIG. 7, the Core Engine will forward packets to/from the drivers to any module that is registered to receive that traffic. In this illustration, however, the focus is on communications, particularly between this instantiation of the security mechanism and another instantiation of the mechanism at another node or with the Administrative Console.

Figure 6:
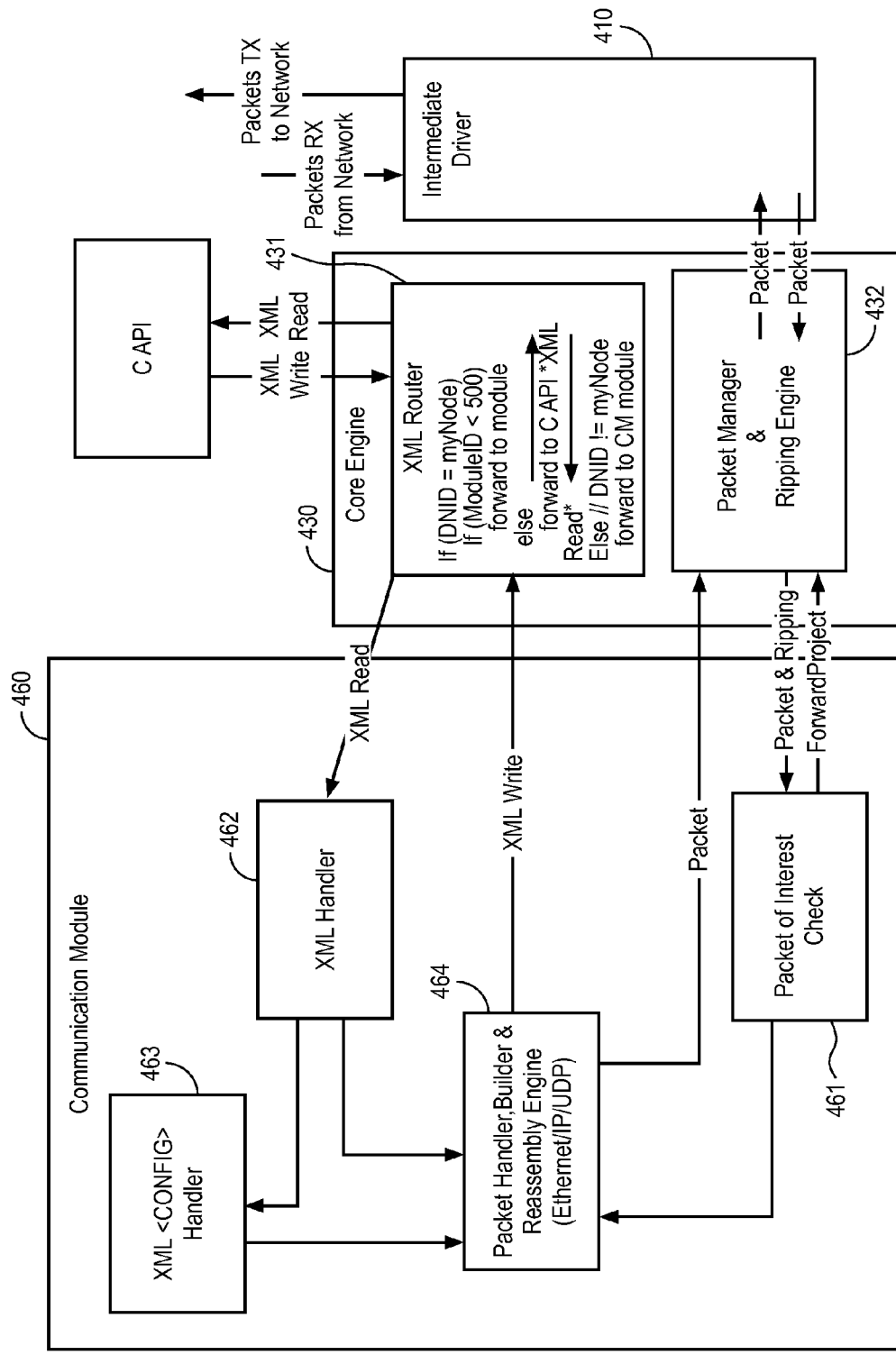
FIG. 6 illustrates another high level view of an installed detection arrangement along with exemplary packet flows, in accordance with an embodiment.

In the arrangement of FIG. 6, the XML Router interacts with C-API, a device that has a read/write interface that enables the AC to communicate with elements of the security mechanism. Furthermore, the XML Router and the Packet Manager and Ripping Engine interface with communication module 460. The Packet Manager and Ripping Engine send an intercepted packet to the Packet of Interest Check 461. If the packet is of interest, it is queried for processing by the Packet Handler, Builder and Reassembly Engine 464 which is responsive to XML Handler 462 and XML Handler 463. The result is that the communications module will take any XML message destined for another security mechanism and package that message into an Ethernet message. The Ethernet message is sent back to the Packet Manager in the CE and is forwarded to the Intermediate Driver for transmission on the network.

Figure 7:
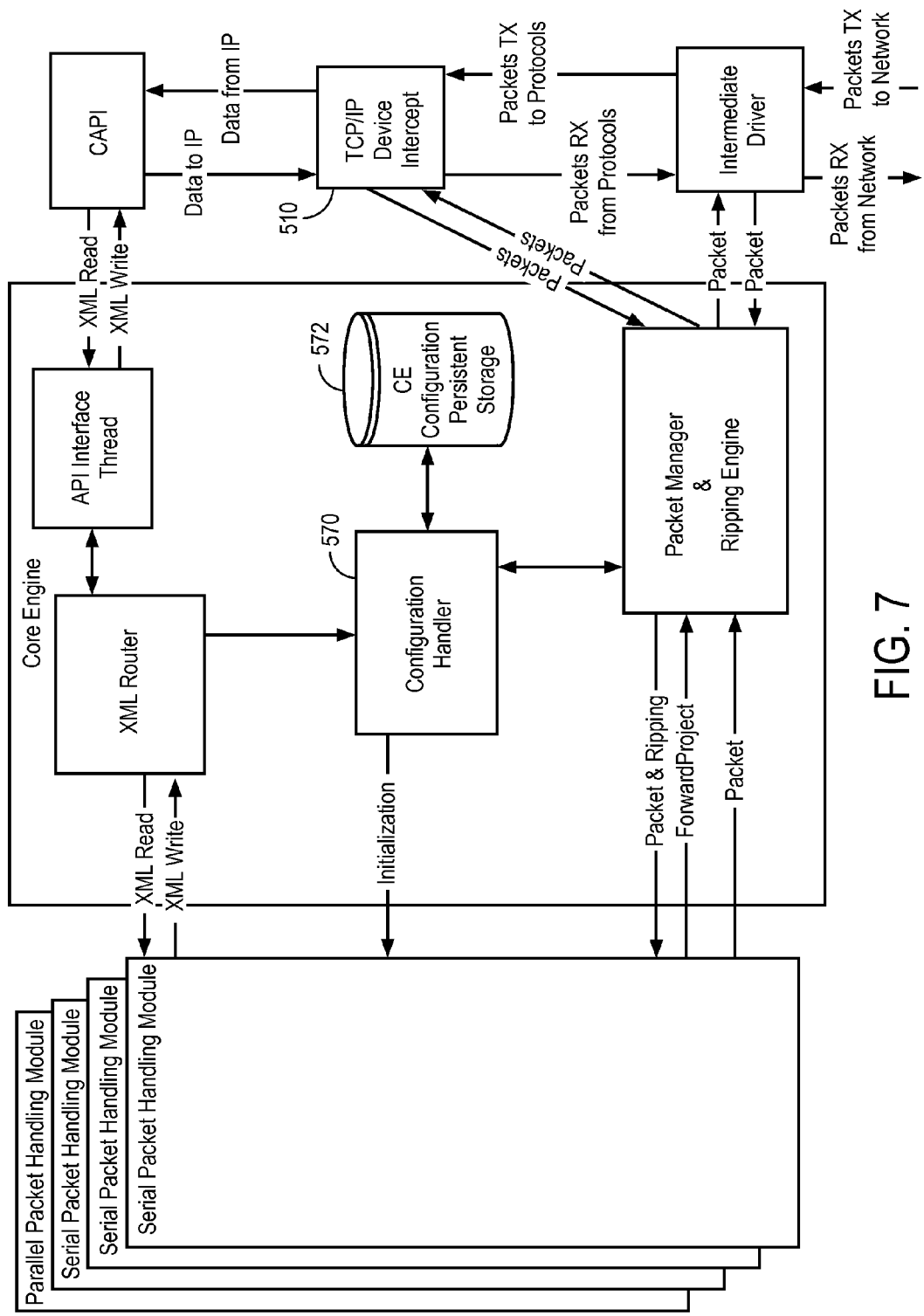
FIG. 7 illustrates an example of a component level arrangement usable in a configuration such as FIG. 5.

FIG. 7 provides another component level view of aspects of the Core Engine in accordance with some embodiments. In this illustration, the Core Engine is shown interfacing with the C-API and the intermediate driver as in FIG. 6. However, this illustration shows the CE interacting with one or more modules and with a TCP/IP Device Intercept. Also, this arrangement shows more aspects of the CE.

In this arrangement, the CE's Packet Manager and Ripping Engine exchanges packets with the intermediate driver, as above, and with the TCP/IP device intercept 510. The Packet Manager and Ripping Engine further exchanges packets with various handling modules as appropriate.

Within the CE, the API interface thread handles the read/write interface from the CAPI as described above with respect to FIG. 6. The XML Router performs the same functions as in FIG. 6 but is now shown to interface more specifically with a configuration handler 570 that has associated CE Configuration persistent storage 572. The Configuration Handler is a thread that will process all CE <CONFIG> messages and will persist the current configuration so it can be retrieved on any re-start. This might even include information about any of the modules that have been installed in the system.

Figure 8:
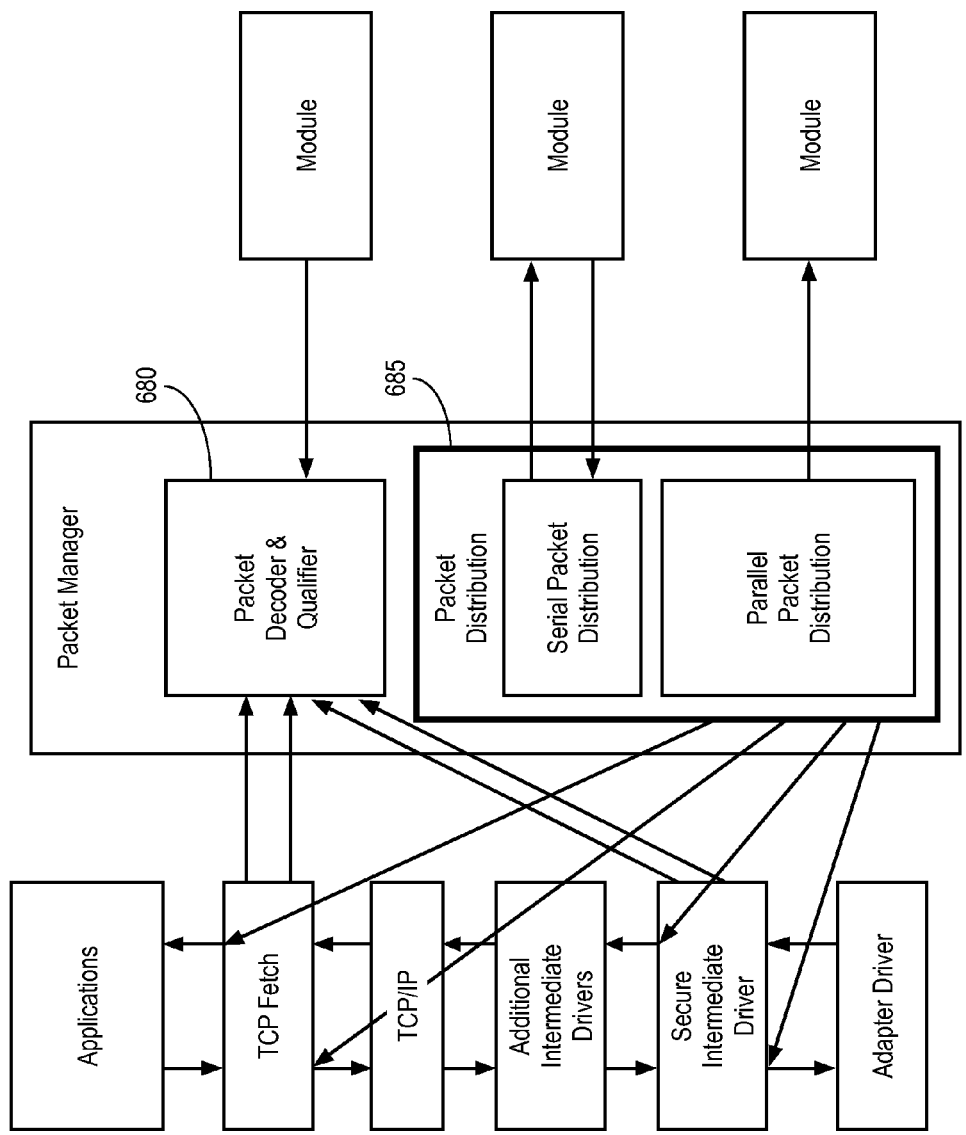
FIG. 8 illustrates an overview of an example of a packet manager usable in a configuration such as that illustrated in FIG. 5.

FIG. 8 provides an illustration of an example of an arrangement of a packet manager (PDM) that could be used in the configurations above, along with items with which the Packet Manager can interact. In the overview shown in FIG. 8, the Packet Manager can include a Packet Decoder and Qualifier 680 as well as a Packet Distribution element 685 that can adapt to either serial distribution of packets (sending the packet to a first module and when processing is complete sending it to a second module) or a parallel distribution of packets (sending a packet to multiple modules in parallel).

As illustrated in FIG. 8, the Packet Decoder can receive packets from the secure intermediate driver and/or a TCP filter. The TCP filter could be a TCP/UDP/Raw filter used to intercept packets/data to and from the TCP/IP device, the UDP device and the Raw device. This will allow a module to receive traffic before it reaches the TCP/IP stack from an application. As in prior descriptions, the Secure Intermediate Driver will be used to intercept packets from any protocol device or any additional intermediate drivers that are installed in the stack, and from the Adaptive Driver.

The PDM will get packets from each connection to the TCP/IP device. In the case where there are multiple TCP/IP addresses the PDM could identify each connection with a unique identifier. This connection identifier will have correlating information stored in an Inventory Module which is described below. The PDM will also get packets from each adapter driver that is currently installed in the system. The PDM will also identify each packet stream to/from the adapter driver with a unique identifier.

The PDM allows modules to request packets/data from each potential source. The PDM has two specific request types; the first is a serial "forward" of the packets and the second is to forward the packet information in parallel with a "smart pointer". Modules that request a serial "forward" of the packets/data will have the potential of modifying the data before the data is forwarded onto the next module or the egress of the PDM. The PDM will allow the modules to specifically ask for traffic from a specific point in the network stack (i.e., egress down from a specific TCP/IP device connection, or ingress up from the adapter driver), or from a specific direction to/from all connections in the network stack (i.e. ingress up from all adapter drivers).

The PDM will perform packet decodes (as much as possible) on all packets/data received by the PDM. The PDM will allow modules to ask for packets/data based on decoded packet/data information.

The following is a list of features that the PDM could be configured to handle:
1. The PDM will obtain traffic flows to/from the Adapter Driver with a connection that is as close to the Adapter Driver as possible.
2. The PDM will obtain traffic flows to/from the TCP/UDP/Raw filter with a connection that is as close to the Applications as possible.
3. The PDM will allow modules to register for serial packet/data forwards based on a specific location and unique device, based on a specific location for all devices, or based on a decoded packet filter.
4. The PDM will allow the modules to modify the serial packet/data traffic and will forward the modified data.
5. The PDM will allow modules to register for parallel packet/data traffic. The PDM will distribute this information using "smart pointers". Modules are not allowed to modify packet/data traffic received with a parallel packet registration.
6. The PDM will allow modules to register for parallel packet decodes information to be sent to the module. The PDM will distribute the packet decodes information using smart pointers.
7. The PDM will allow modules to specify the priority of the filter for serial packet forwarding, parallel packet forwarding, and parallel packet decode forwarding for packets/data received at any specific location. The priority of the filter will determine what order packets will be forwarded to a module. A module may specify a different priority for packets received at different points. For example a module may specify a high priority for packets received on the ingress from the adapter drivers so that it sees packets before any other modules for traffic on the way in, and specify a low priority for packets received on the ingress from the protocol drivers so that it sees packets last after any other modules for traffic on the way out.

The modules use various communication methods in support of deployment, control and collaboration. The AC 136 propagates the Nat-Piercing mechanism out to the various network nodes via the data transmission medium. It might propagate the mechanism in stages so as to first cause a receiving network node to install the core aspect or core engine of the mechanism when a user of the node logs in. The installation is designed to be transparent to the user and the core engine is hooked into the stack of the operating system of the node. This installation thus yields the disposition of the core engine and Guest Agent as shown in each of nodes 110 and 120.

Once the core engine component is installed, the AC 136 may send a communication module component that enables data traffic pertaining to the collaboration mechanism functionality to be conveyed or communicated to and/or from that network node. This data includes a network routable proxy location that both the AC 136 and the newly installed Guest Agent can both connect to as required by the user. These components are shown as the node communication modules in each of nodes 110 and 120. Collectively, the core engine, the node communication module, and the additional modules described below comprise a set of functional modules.

Once the node communication module is installed, the AC 136 can forward one or more additional modules to the node. Each module can be designed to receive data packets intercepted between an adapter driver and a protocol layer of the node's operating system and then analyze the data packets to determine whether they are indicative of some route to the proxy server address that has been pre-described by the AC 136. For an Ethernet type packet, an example of the relevant data would be:
Source: 00-1E-4C-05-7b-7E
Destination: 00-18-39-B1-42-CB (The Router)
  For an IP type packet, an example of the relevant data would be:
Version: 4
Header Length: 20
Source: 192.168.1.106
Destination: 72.14.204.19 (pre-configured Proxy Server)
Service Type: 0x00
  For a TCP type packet, an example of the relevant data would be:
SourcePort: 4168
DestPort: 443 (Preconfigured Port).

Given the presence of an available route the Nat-piercing agent will attempt to register with the AC 136 via the proxy server.

The modules for communication and/or nat-piercing are associated with the module component 120. These modules are intended to handle the details of the communication operations. The modules also can be dynamically updated.

The above-described architecture is designed to include multiple strategies for packet drivers. An appropriate packet driver for a particular customer or node may depend on customer requirements. While the specifics may vary, it is beneficial if a packet driver has one or more of the following characteristics:

1. it intercepts packets as close to the adapter driver as possible;
2. it allows the packet driver to be re-installed if disabled by user control;
3. it detects whether the connection to the adapter driver is hooked/intercepted/tampered with in any way; and
4. persists in the core engine in non-volatile memory and load and execute the Core Engine.

Additionally, the Agent described above can be designed so that, for example in a Microsoft® operating system environment, it will effectively look like an adapter driver to the protocols and a protocol to the adaptive driver. The Agent can then forward all of the packets to the CE and it can effectively forward all packets between the protocols and the adapter driver transparently if desired.

An agent with NAT-piercing module as described above is capable of piercing through multiple categories of private and public cloud infrastructure including those with Network Address Translation configurations. The agent is applicable for any client server relationship where there is a barrier that does not allow an outside node to initiate communication with an inside node due to any barrier, including firewalls, and not just those enterprises that utilize NAT systems. The Agent is configured with the capability to analyze its environment and determine the best route to establish/re-establish its communication with the Admin Console.

One of the functions of the agent is to reconfigure the network configurations of the migrated VMs to re-establish storage, peer, and admin console communication. The AC 136 provides the data to pre-describe the proxy address. It gets this from the user's input into the configuration UI, which, in one embodiment, may be a simple input of xxx.xxx.xxx.xxx/port #.

One embodiment of a method for migrating one or more nodes to the cloud structure are illustrated with reference to FIG. 9. The method of FIG. 9 is performed by processing logic that may comprise hardware (circuitry, dedicated logic, etc.), software (such as is run on a general purpose computer system or a dedicated machine), or a combination of both.

Figure 9:
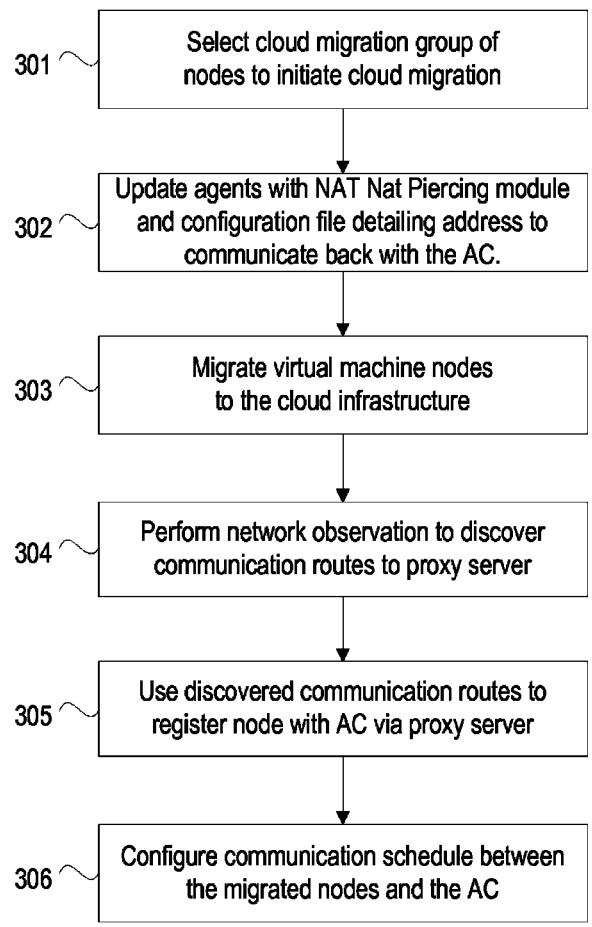
FIG. 9 illustrates a flow diagram of one embodiment of a method for migrating a node to a cloud infrastructure.

Referring to FIG. 9, at block 301, cloud migration is initiated by selecting a cloud migration group or one or more nodes. A cloud migration group may be established manually by a user through the user interface. Cloud migration service groups may also be determined by analyzing an ontological description of the network.

When cloud migration is initiated, the agent's Cloud Communications module sends a message to the Business logic EJB factory 624. An EJB is created to gather the nodes and node dependency on the infrastructure to assemble the cloud migration group.

At block 302, the agents of the cloud migration group nodes are updated by the Agent present on the Administrative Console with a NAT-piercing module and a configuration file detailing a proxy address to communicate back with the AC.

At block 303, the Virtual Machines images with the updated Agents and configurations are deployed to the Cloud using the appropriate methods outlined by the particular cloud provider. At block 304, the NAT-piercing modules of the agents that have been migrated perform a network observation based on the methods described above. This observation yields a list of potential routes for the agent to take to enable the agent to NAT Pierce its Cloud network infrastructure and to re-establish communication with the enterprise network. At block 305, the cloud communication module uses the routes in the list to register with the AC 136 via the proxy server and then send and receive packets via the proxy sever that both the AC 136 and the Core Engine 110 of the migrated agent have access to. A communication schedule is then set (block 306) for communications between the AC 136 and the migrated nodes, with the default being a minimum of every 4 hours.

The Cloud communication module queries the Inventory module via the O/S API. The query returns a list of the routes available to the agent. Once the possible routes have been determined, the routes may be attempted sequentially in the order listed by the NAT-piercing module until one route is successful.

A connection is attempted via the UDP/TCP/IP filter driver 41 shown in FIG. 4. A test message is sent to the filter driver with a fixed destination that is encoded by the agent instantiation mechanism in the Web Application controller 627 and sent when the agent is instantiated into the Virtual node. This fixed address is the proxy server destination for the proxy server 19 depicted in FIG. 4. The proxy server 19 allows an inbound request from a Cloud migrated VM node to re-establish communication with the Web application controller 627 described in FIG. 2. A Communication schedule is configured and sent as a message thru the data collection interface to the proxy server 19 which in turn performs a Network Address translation and then allows for scheduled full duplex communication with the Cloud Migrated node. Configuration is applied to the virtual machine by the Administration Console Agent and updated by the Agents communicating with the virtual machine.

In one embodiment, the list of potential communication routes generated by a NAT-piercing module of a migrated agent may be shared across multiple migrated agents. That is, one of the migrated Virtual Machines may concentrate the communication of the aggregate of virtual Machines within its network purview. The other migrated VMs will attempt to register with the Admin Console though the focused Virtual Machine with both the Agent containing the Nat Piercing Module and an AC Agent local to the cloud based Virtual Machine.

The route list may also be sent via the communication module to the AC 136 where it is stored in a configuration file in the database in a table specific to the Cloud Migration Service Group that belongs to the node sending the data. When a new node is to be migrated to the same cloud infrastructure, the AC 136 retrieves the record and updates the configuration file on the new node. The route information may be used by future nodes that have or will be migrated to the same network infrastructure where the route list was created by a nat-piercing module.

It can be seen from the foregoing, that a software agent including cloud communications and NAT piercing modules can allow a migrated node to establish communication with Enterprise nodes that are continually migrated and configured by the cloud provider with Network Address Translation.

The agent communicates with the Admin Console via the proxy server 19 at a predefined time interval. In one embodiment, the communications may be XML based messaging on a proprietary UDP protocol with 128 bit encryption.

The NAT piercing module of the agent introspects the local network configuration and determines a route to the internet, allowing the agent to connect to the proxy server at the predefined time intervals specified in the preconfigured schedule. Once the remote agents have updated the admin console the remote agents await messages from the admin console. Once messages have ceased in either direction for a preconfigured duration, e.g. 30 seconds, the connection is dropped by both parties. The agents may check in with the administration console at a pre defined interval, such as every 20 minutes from either initial agent distribution or last successful communication.

While the above described systems and methods have been described with particular reference to migration to cloud structures that use NAT techniques, a person skilled in the art will readily understand that the invention is applicable to other systems. For example, the agent migration process may be applicable for any client server relationship where there is a barrier, such as a firewall, that does not allow an outside node to initiate communication with an inside node. An advantage of the above described agent migration processes is that something configured to run on one network can be migrated to another network while easily and automatically re-establishing communications with required nodes of the original network.

Figure 10:
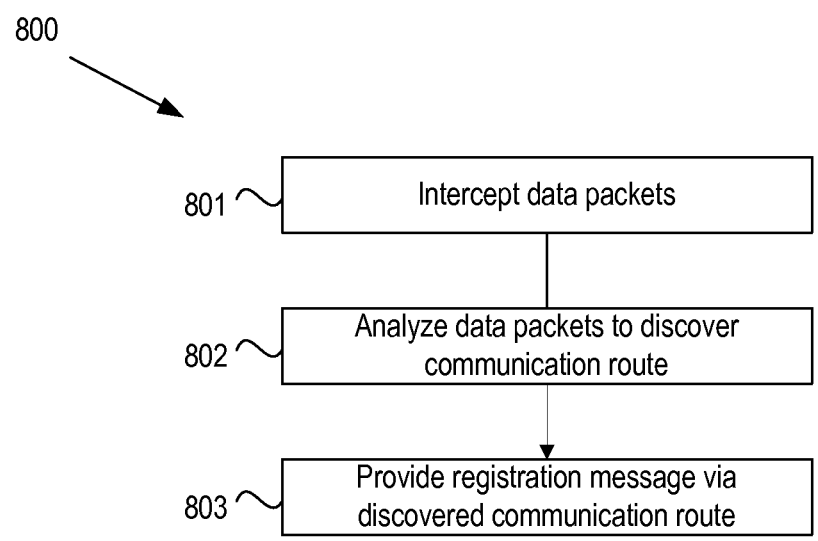
FIG. 10 depicts a flow diagram of one embodiment of a node registration method.

FIG. 10, method 800, is flow diagram of one embodiment of a node registration method. The method of FIG. 10 is performed by processing logic that may comprise hardware (circuitry, dedicated logic, etc.), software (such as is run on a general purpose computer system or a dedicated machine), or a combination of both. In one embodiment, the method of FIG. 10 is performed by a processor of a cloud infrastructure to which a node has been migrated.

Referring to FIG. 10, at block 801, one or more data packets are intercepted between an adapter driver and a protocol layer of a migrated node's operating system. At block 802, the one or more data packets are analyzed to determine a communication route to a proxy server address. At block 803, a registration message for a migrated node of an enterprise network is provided to the enterprise network via the proxy server address.

Figure 11:
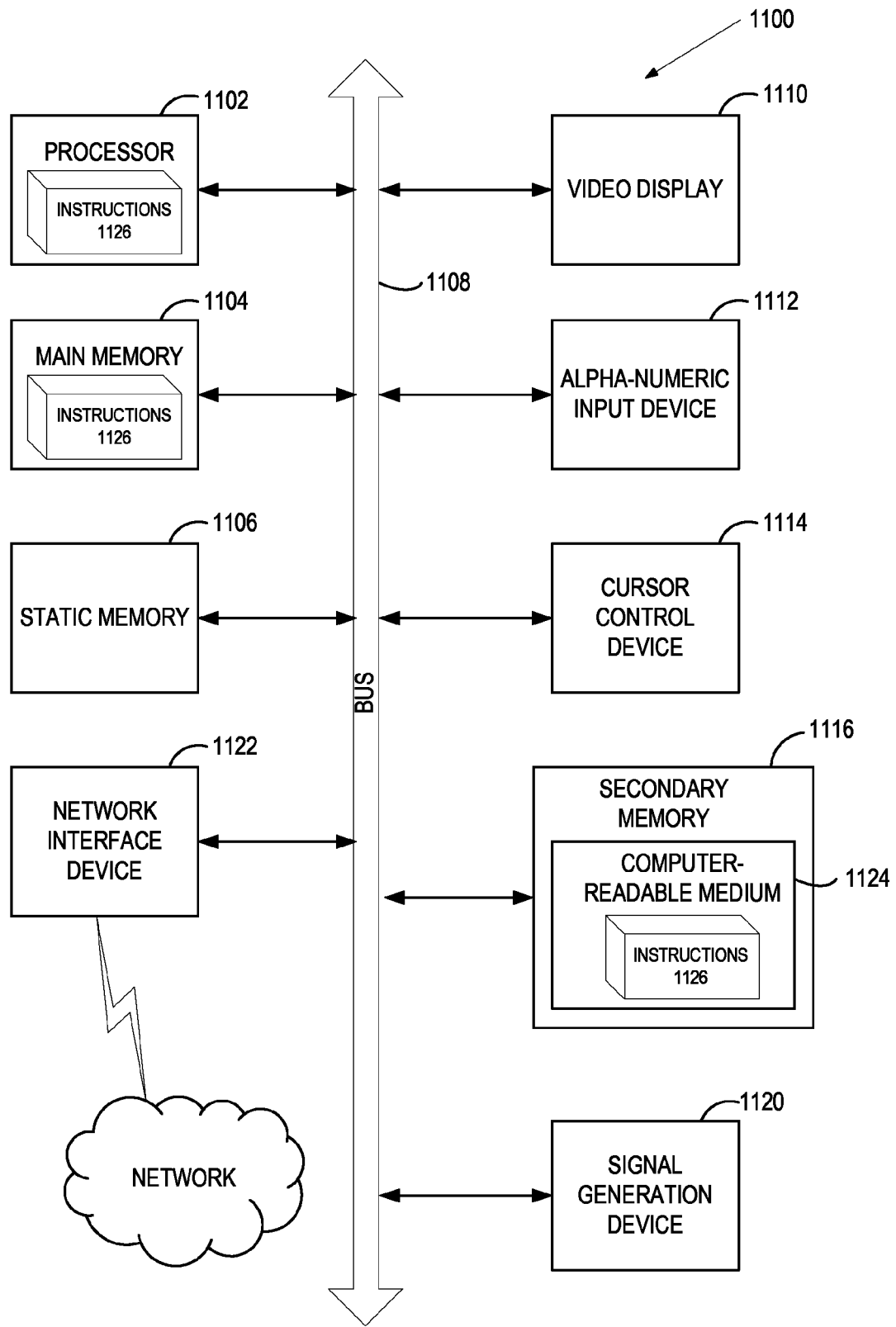
FIG. 11 is a block diagram of an exemplary computer system that may perform one or more of the operations described herein.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1116 (e.g., a data storage device), which communicate with each other via a bus 1108.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute instructions 1126 for performing the operations and steps discussed herein.

The computer system 1100 may further include a network interface device 1122. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The secondary memory 1116 may include a machine-readable storage medium (or more specifically a computer-readable storage medium) 1124 on which is stored one or more sets of instructions 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

The machine-readable storage medium 1124 may also be used to store software performing the operations discussed herein, and/or a software library containing methods that call this software. While the machine-readable storage medium 1124 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

identifying a plurality of virtual machine nodes in an enterprise network in view of an ontology describing the operational usage and state of the plurality of virtual machines;

deploying a plurality of agents to the plurality of virtual machine nodes while the plurality of virtual machine nodes are connected to the enterprise network, wherein each agent is to establish communication with the enterprise network after migration of a respective virtual machine node to a cloud infrastructure;

migrating, by a processing device, a virtual machine node of the plurality of virtual machine nodes to the cloud infrastructure external to the enterprise network, the virtual machine node having an agent of the plurality of agents, wherein the agent is to track information regarding one or more network connections of the virtual machine node;

responsive to the migration of the virtual machine node to the cloud infrastructure, re-establishing communication between the virtual machine node in the cloud infrastructure and the enterprise network using the agent that causes data traffic to be communicated between the virtual machine node in the cloud infrastructure and the enterprise network in view of the tracked information regarding the one or more network connections; and updating the ontology in view of the re-established communication between the virtual machine node in the cloud infrastructure and the enterprise network, wherein the updating is facilitated by the agent.

2. The method of claim 1 wherein the agent comprises an address of a proxy server accessible by the agent and by the enterprise network and wherein re-establishing communication between the virtual machine node and the enterprise network comprises the agent registering the virtual machine node with the enterprise network via the proxy server.

3. The method of claim 2 wherein the agent is to determine a communication route to the proxy server.

4. The method of claim 2 wherein the proxy server:
receives a registration message from the agent of the migrated virtual machine node; and
performs a network address translation for the registration message.

5. The method of claim 4 further comprising establishing scheduled full duplex communication between the enterprise network and the migrated virtual machine node via the proxy server.

6. The method of claim 3 wherein the agent is to:
intercept data packets between an adapter driver and a protocol layer of the migrated virtual machine node's operating system; and
analyze the intercepted data packets to determine a communication route to the proxy server.

7. The method of claim 3 wherein the agent is to share the communication route to the proxy server with one or more other nodes of the enterprise network that have been migrated to the cloud infrastructure.

8. The method of claim 3 wherein the agent is to communicate a list of potential communication routes to the enterprise network.

9. The method of claim 1 wherein the agent comprises a communication schedule.

10. A system comprising:
an administration console having a memory and a processing device, the processing device to:

identify a plurality of virtual machine nodes in an enterprise network in view of an ontology describing the operational usage and state of the plurality of virtual machines;

communicate with a proxy server, wherein the proxy server is to provide communications between an enterprise network comprising a plurality of virtual machine nodes and a cloud infrastructure;

deploy a plurality of agents to the plurality of virtual machine nodes while the plurality of virtual machine nodes are connected to the enterprise network and prior to migration of the plurality of virtual machine nodes to the cloud infrastructure;

migrate a virtual machine node of the plurality of virtual machine nodes to the cloud infrastructure, the virtual machine node having an agent of the plurality of agents, wherein the agent is to track information regarding one or more network connections of the virtual machine node, and wherein responsive to the migration of the virtual machine node to the cloud infrastructure, the agent is to re-establish communication with the administration console via the proxy server by causing data traffic to be communicated between the virtual machine node in the cloud infrastructure and the enterprise network in view of the tracked information regarding the one or more network connections; and update the ontology in view of the re-established communication between the virtual machine node in the cloud infrastructure and the enterprise network, wherein the updating is facilitated by the agent.

11. The system of claim 10 wherein the agent comprises the address of the proxy server prior to migration of the node to the cloud infrastructure.

12. The system of claim 10 wherein the agent comprises a communication schedule prior to migration of the node to the cloud infrastructure.

13. The system of claim 10 wherein the agent is to determine a communication route to the proxy server after migration of the node to the cloud infrastructure.

14. The system of claim 10 wherein the proxy server is to receive a registration message from the agent after migration of the node to the cloud infrastructure and to perform a network address translation for the registration message.

15. The system of claim 10 wherein the agent is to determine a plurality of potential communication routes to the proxy server from the cloud infrastructure.

16. The system of claim 15 wherein the agent is to:
intercept data packets between an adapter driver and a protocol layer of the migrated node's operating system; and analyze the intercepted data packets to determine one or more communication routes to the proxy server.

17. The system of claim 16 wherein the agent is to share the one or more communication routes with one or more other nodes of the enterprise network that have been migrated to the cloud infrastructure.

18. The system of claim 16 wherein the agent is to provide the one or more communication routes to the administration console, and wherein the administration console is to pre-configure an agent of a further node to be migrated to the cloud infrastructure with the one or more communication routes.

* * * * *